G. CARLSON.
ATTACHMENT FOR HOES.
APPLICATION FILED DEC. 2, 1912.

1,075,330.

Patented Oct. 14, 1913.

Witnesses:
H. J. Palmer
L. V. Daughty

Inventor:
G. Carlson
H. Parker
Attorney.

UNITED STATES PATENT OFFICE.

GUNNARD CARLSON, OF ROCKFORD, ILLINOIS.

ATTACHMENT FOR HOES.

1,075,330.

Specification of Letters Patent.

Patented Oct. 14, 1913.

Application filed December 2, 1912. Serial No. 734,515.

*To all whom it may concern:*

Be it known that I, GUNNARD CARLSON, a citizen of Sweden, residing at Rockford, in the county of Winnebago, in the State of Illinois, have invented certain new and useful Improvements in Attachments for Hoes, of which the following is a specification.

This invention relates to improvements in attachments for hoes and its object is to produce an adjustable attachment for a hand hoe adapted to serve as a pick-up for potato vines and the like that may have fallen or have been crushed to earth. After a wind or rain storm the fallen vines may prevent hilling and in addition to this they may be full of dirt which my attachment will shake off.

With the foregoing and other objects in view the invention consists in the combination and arrangement of parts to be hereinafter fully described in the following specification, pointed out in the claims and illustrated in the accompanying drawing which forms a part of the specification and in which—

Figure 1:
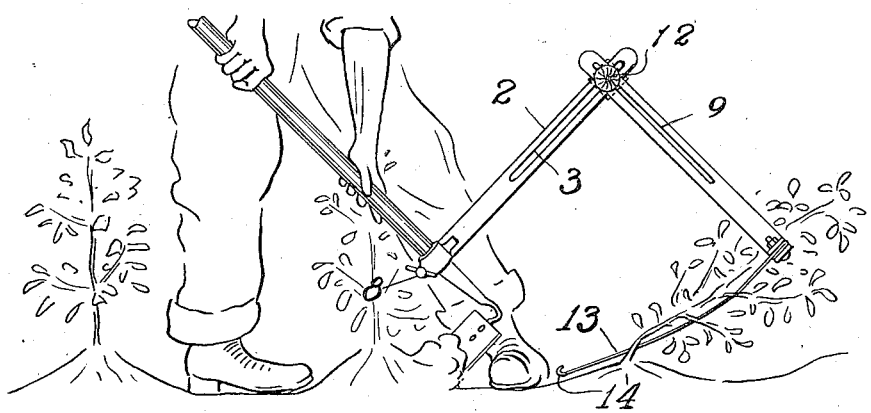
Figure 2:
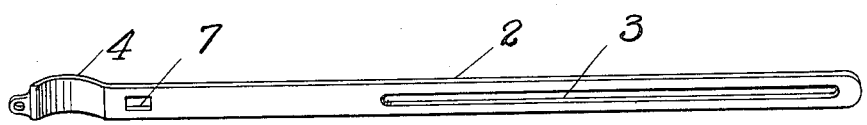
Figure 3:
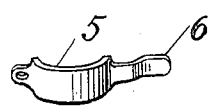
Figure 4:
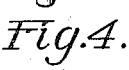
Figure 5:
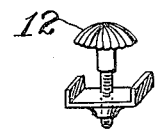
Figure 6:
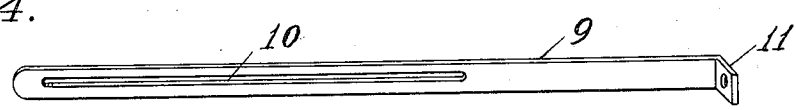
Figure 7:
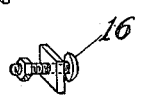
Figure 8:
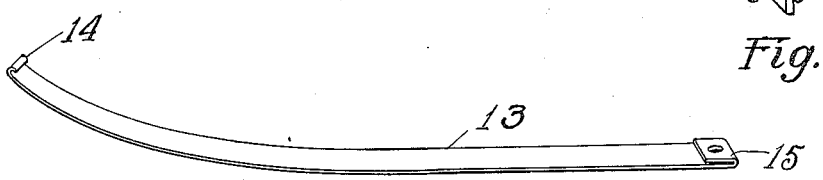

Figure 1 is a side elevation of my improved attachment secured to a hand hoe. Fig. 2 is a view of the slotted hoe-engaging link. Figs. 3, 4, 5 and 7 are details of the means employed for fastening the parts of the attachment together. Figs. 6 and 8 are views of two of the links of my attachment.

Like reference characters indicate corresponding parts throughout the several views.

1 is an ordinary hand hoe to the lower end of the handle of which my attachment is adapted to be secured.

My attachment comprises a link 2 formed with an elongated slot 3 and at one end with a curved semi-collar like portion 4 adapted to go partly around the hoe handle and in connection with a similarly shaped separate piece 5 to form a complete collar for the hoe handle. The piece 5 is provided with a prong 6 adapted to enter an aperture 7 in the link 2 while a screw 8 is used to fasten together the opposite end of the piece 5 and the collar-like portion 4. 9 is another link slotted longitudinally as at 10 and formed with an angular apertured extremity 11; a set screw 12 is used to fasten the links 2 and 9 together through the medium of their slotted portions. A curved link 13 provided with a rolled extremity 14 and with its opposite end apertured and bent back upon the body portion as at 15 which is also apertured in alinement with the aperture in the bent termination is secured by a screw or bolt 16 to the angular extremity of the link 9 as shown in Fig. 1.

It is readily seen that the link 9 is adjustable upon the link 2 with relation to the hoe handle 1 and that the link 2 is adjustable upon the link 9 with relation to the curved link 13.

In hilling potatoes after the vines have been blown to the ground the curved link 13 may pick up and shake a fallen vine thus ridding it of dirt while the hoe is being used to make a hill and incidentally getting the vine out of the way of the hoe which will soon be ready for the next hill of potatoes.

What is claimed is:—

1. As an attachment for a hand hoe, a pair of longitudinally slotted links secured together, one of said links being secured to the hoe handle and a curved link secured to the other slotted link.

2. As an attachment for a hand hoe, a pair of links secured together, one of said links being secured to the hoe handle and a curved link secured to the other link.

3. As an attachment for a hand hoe, a pair of longitudinally slotted links adjustably secured together, one of said links being secured to the hoe handle and a curved link secured to the other slotted link.

4. As an attachment for a hand hoe, a pair of longitudinally slotted links secured together, one of said links being secured to the hoe handle and a curved link secured to the other slotted link and adjustable with relation to the first slotted link.

5. As an attachment for a hand hoe, a pair of longitudinally slotted links secured together, one of said links being secured to the hoe handle and the other link being adjustable with relation to said hoe handle and a curved link secured to the last mentioned link.

In testimony that I claim the foregoing as my own I have hereto affixed my signature in the presence of two subscribing witnesses.

GUNNARD CARLSON.

Witnesses:
G. E. JOHNSON,
WILLIAM JOHNSON.

Copies of this patent may be obtained for five cents each, by addressing the "Commissioner of Patents, Washington, D. C."